US009429169B2

(12) United States Patent
Bouru et al.

(10) Patent No.: US 9,429,169 B2
(45) Date of Patent: Aug. 30, 2016

(54) TURBINE ENGINE HAVING A STAGE OF VARIABLE-PITCH STATOR VANES WITH INDEPENDENT CONTROL

(75) Inventors: Michel Andre Bouru, Montereau sur le Jard (FR); Daniel Germain Alexis Kettler, Montereau sur le Jard (FR)

(73) Assignee: SNECMA, Paris (FR)

( * ) Notice: Subject to any disclaimer, the term of this patent is extended or adjusted under 35 U.S.C. 154(b) by 969 days.

(21) Appl. No.: 13/511,068

(22) PCT Filed: Nov. 19, 2010

(86) PCT No.: PCT/FR2010/052453
§ 371 (c)(1),
(2), (4) Date: Sep. 20, 2012

(87) PCT Pub. No.: WO2011/061450
PCT Pub. Date: May 26, 2011

(65) Prior Publication Data
US 2013/0028716 A1    Jan. 31, 2013

(30) Foreign Application Priority Data
Nov. 20, 2009    (FR) ...................................... 09 58232

(51) Int. Cl.
*F01D 17/16*    (2006.01)
*F04D 29/56*    (2006.01)

(52) U.S. Cl.
CPC ........... *F04D 29/563* (2013.01); *F01D 17/162* (2013.01); *F05D 2260/50* (2013.01); *F05D 2270/62* (2013.01); *Y02T 50/671* (2013.01)

(58) Field of Classification Search
CPC ............... F01D 17/162; F04D 29/563; F05D 2260/50; F05D 2270/62

USPC ................................ 415/150, 151, 159–162
See application file for complete search history.

(56) References Cited

U.S. PATENT DOCUMENTS

| 3,861,822 | A | | 1/1975 | Wanger | |
|---|---|---|---|---|---|
| 3,958,896 | A | * | 5/1976 | Vikhirev et al. | 415/151 |
| 4,275,560 | A | | 6/1981 | Wright et al. | |
| 4,979,874 | A | * | 12/1990 | Myers | 415/160 |
| 2004/0115040 | A1 | | 6/2004 | Bathori et al. | |

(Continued)

FOREIGN PATENT DOCUMENTS

| DE | 10 2008 002 867 | 12/2008 |
|---|---|---|
| FR | 2 881 190 | 7/2006 |
| JP | 55-104531 A | 8/1980 |

(Continued)

OTHER PUBLICATIONS

Notice of Rejection issued Aug. 19, 2014 in Japanese Patent Application No. 2012-539389 (submitting English language translation only).

(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A turbine engine including a stator including variable-pitch vanes that are controlled stage by stage. An actuator ring connected by crank-arms to the variable-pitch vanes is coupled to at least one adjacent specific drive unit in a general form of an actuator.

11 Claims, 2 Drawing Sheets

(56) References Cited

U.S. PATENT DOCUMENTS

Figure 1:
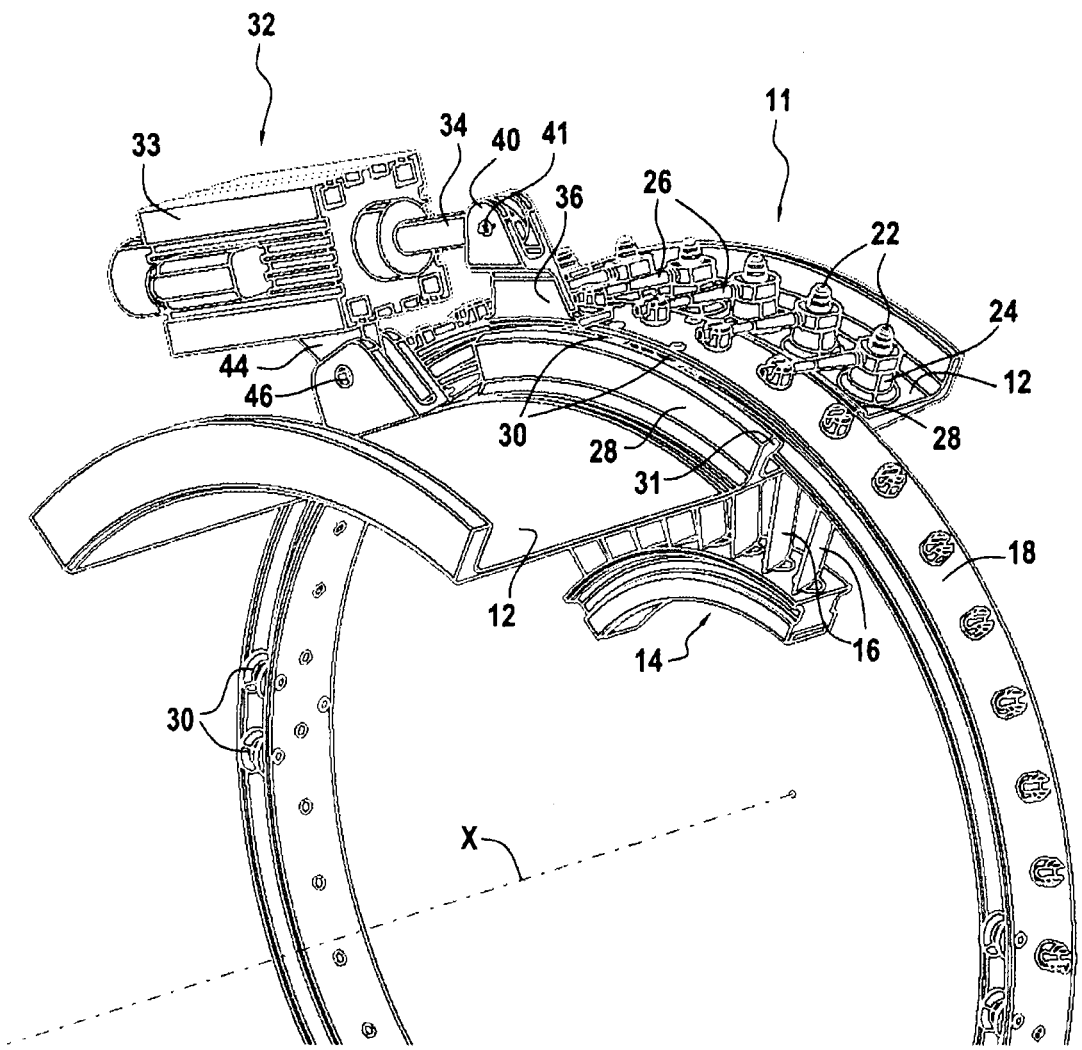

2009/0238681 A1* 9/2009 Bouru .................. F01D 17/162
                                                              415/150
2010/0260591 A1* 10/2010 Martin et al. ..................... 415/1

FOREIGN PATENT DOCUMENTS

| | | |
|---|---|---|
| JP | 58-62303 A | 4/1983 |
| JP | 6-58173 U | 8/1994 |
| JP | 2004-190660 A | 7/2004 |

OTHER PUBLICATIONS

International Search Report Issued Aug. 8, 2011 in PCT/FR10/52453 Filed Nov. 19, 2010.

* cited by examiner

TURBINE ENGINE HAVING A STAGE OF VARIABLE-PITCH STATOR VANES WITH INDEPENDENT CONTROL

The invention relates to a turbine engine comprising a casing housing at least one stator stage having variable-pitch vanes controlled by an actuator ring coaxially surrounding said casing and being connected by crank-arms to said variable-pitch vanes. The invention relates more particularly to individualized control of such an actuator ring. The invention applies in particular to the field of airplane jets, and more particularly to a compressor in such a jet.

In a turbine engine of the above-specified kind, a compressor stator is fitted with at least one stage of variable-pitch nozzle vanes, the orientation of which is adjustable in the flow passage. Thus, the angle of attack of the vanes may be controlled as a function of the operating conditions of the airplane, by a servo-control system that controls the movement of said ring.

On airplanes, the relationships for varying the pitch of variable-pitch vanes are becoming ever more complex, to such an extent that it is becoming more and more desirable to be able to control variable-pitch vanes on a stage-by-stage basis. As a result, actuation by means of a common actuator associated with a transmission linkage that is complex, expensive, bulky, and heavy is becoming less and less desirable.

Document EP 0 527 593 describes a linear electric motor structure adapted to driving an actuator ring. The system described makes use of electrical induction elements situated radially outside the actuator ring. Those induction elements are voluminous and difficult to incorporate in the space available inside the casing. In addition, the actuator ring is not centered in satisfactory manner, particularly when considering potential variations of diameter (due to the rise in temperature) between the ring and the casing that supports it.

The invention enables all of those problems to be solved.

More particularly, the invention provides a turbine engine comprising a casing housing at least one stator stage having variable-pitch vanes controlled by an actuator ring coaxially surrounding said casing, the ring being constrained to move in turning only about an axis of said casing and being connected by crank-arms to said variable-pitch vanes, the turbine engine being characterized in that said actuator ring is coupled to at least one adjacent specific drive unit generally in the form of an actuator and comprising two portions forming a cylinder and a rod, in that one of the portions is hinged to said casing, and in that the other portion is hinged to a lateral extension of said ring.

The term "specific drive unit" is used to mean that each actuator ring is indeed operated independently of the others if the turbine engine includes a plurality of stator stages fitted with variable-pitch vanes, as is generally the case. This type of control thus involves at least one and preferably two drive units for each ring. Such a drive unit is compact and placed as close as possible to the actuator ring, thereby simplifying and lightening the system by means of a direct hinged connection between the ring and the drive unit. It is easier to distribute a plurality of drive units around the casing, each unit having mean power that is sufficient for actuating only one ring as contrasted with a single high-power drive unit that is therefore of large radial size and weight and that is connected by a complicated mechanism to the various rings. In addition, as mentioned above, the ability to control each actuator ring (and thus each stage of variable-pitch vanes) independently from the others is itself advantageous for good control over the operating conditions of the turbojet.

In simple and advantageous manner, the rod of the actuator-forming drive unit extends along an axis lying in a plane parallel to a midplane of said actuator ring. For example, the rod is hinged to the ring and said cylinder is hinged to said casing In simple manner, said lateral extension includes a fork, and one end of the rod is hinged to said fork about an axis parallel to the axis of said casing.

Preferably, the cylinder includes a lateral tab hinged to a fork secured to said casing. Nevertheless, the inverse arrangement is also possible.

According to a very advantageous characteristic, the actuator is of the linear motion electric motor type. It is possible to use linear motors of the contactless type as developed, for example, by the supplier "Copley Controls Corp." By way of example, it is possible to use a motor having the reference XTB3810. It benefits from being compact, with a cylinder having a length of 122 millimeters (mm) for a stroke of about 75 mm.

Preferably, the or each actuator ring is coupled to two above-mentioned adjacent specific drive units that are substantially diametrically opposite.

Figure 2:
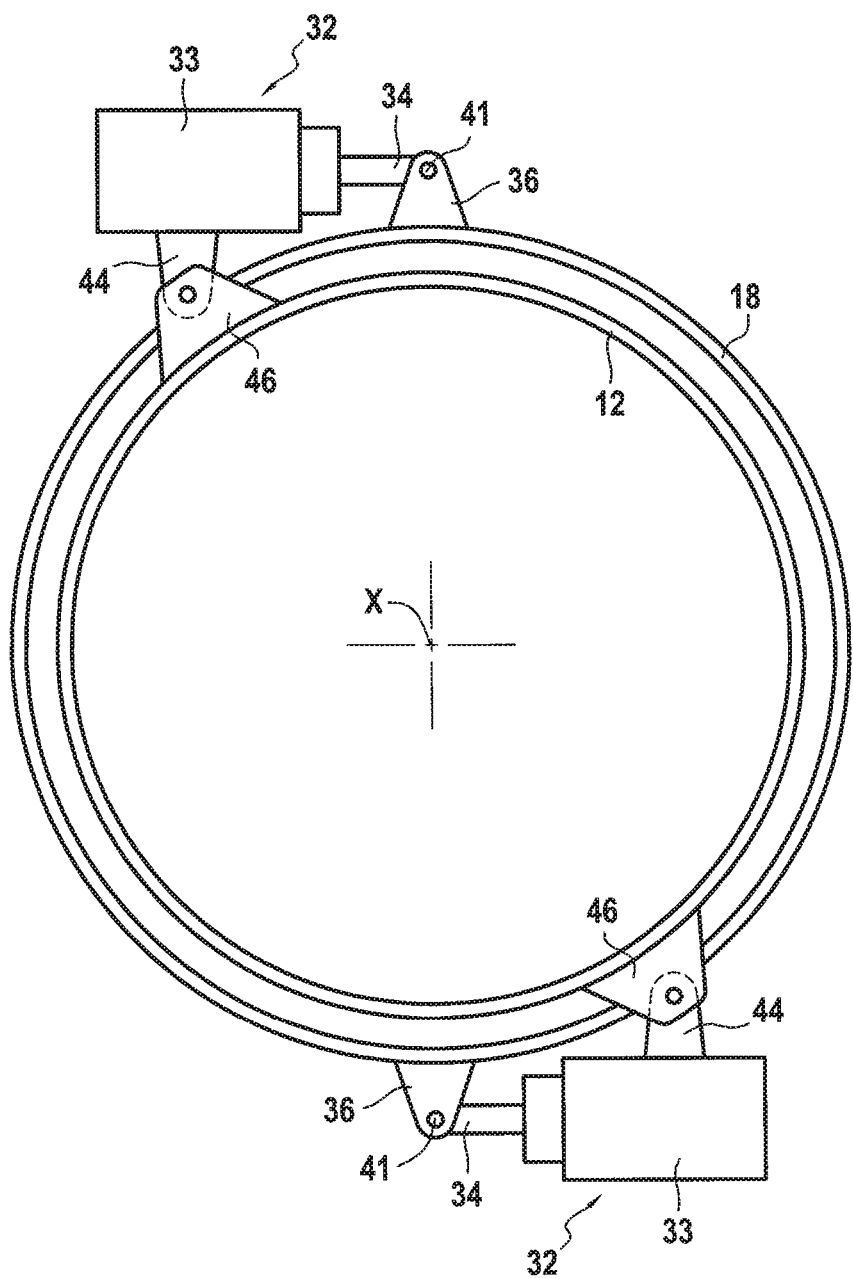

The invention can be better understood and other advantages thereof appear more clearly in the light of the following description of a turbine engine in accordance with the principle of the invention, given purely by way of example and made with reference to the accompanying drawing, in which:

FIG. 1 is a fragmentary perspective view of a turbine engine fitted with a variable-pitch vane control system of the invention; and FIG. 2 is a front view of a turbine engine fitted with a variable-pitch vane control system of another embodiment of the invention.

With reference to the drawing, there can be seen part of a turbine engine 11 and more particularly its casing 12 housing at least one rotor wheel (not shown) and at least one stator stage 14 having a ring of variable-pitch vanes 16. These vanes are controlled by an actuator ring 18 coaxially surrounding the casing 12. If the casing surrounds a compressor, then it houses several compression stages, each comprising a rotor wheel and a stator stage 14 as shown. In the invention, at least one and preferably several stator stages are controlled independently of one another. For this purpose, the variable-pitch vanes of a given stator stage are provided with pivots 22 passing through smooth bearings 24 defined radially through the wall of the casing 12. Each of these pivots is connected in hinged manner by a crank-arm 26 to a common actuator ring 18 coaxially surrounding the casing. The ring is constrained to move in turning only about the axis X of the casing. For this purpose, the casing has guide rail segments 28 extending annularly on either side of the edges of the ring 18. The ring carries grooved wheels 30 that engage with lateral ribs 31 on the rails. The above-described arrangement is known.

According to important characteristics of the invention, actuator ring 18 is coupled to at least one adjacent specific drive unit 32, generally in the form of an actuator, comprising two portions forming a cylinder 33 and a rod 34. One of the portions is hinged to the casing 12 and the other portion is hinged to a lateral extension 36 of said ring. The arrangement as defined above suffices to turn the ring 18 and consequently to modify the orientation of the stationary vanes 16 of the stator stage. Nevertheless, for reasons of balance and also in order to use drive units that are more compact, the or each actuator ring may advantageously be coupled to two of the above-mentioned adjacent specific drive units that are substantially diametrically opposite. For example, the actuator ring 18 as shown may be provided with two diametrically opposite lateral extensions 36, as shown in FIG. 2, and, under such circumstances, the casing carries two drive units arranged so as to combine their forces in order to turn the ring 18 in one direction or the other.

The actuator 32 that is generally in the form of an actuator is advantageously of the linear motion electric motor type as defined above. The rod 34 of said actuator-forming drive unit extends along an axis that lies in a plane parallel to a midplane of the actuator ring 18. In the example shown, the rod 34 is hinged to the ring 18, and the cylinder 33 is hinged to the casing 13.

More precisely, the lateral extension 36 includes a fork 40 and the end of the rod includes a flat portion forming a connecting rod head that is pierced and that is hinged to said fork about an axis 41 parallel to the axis X of the casing. Furthermore, the cylinder 33 has a lateral tab 44 that is hinged to a fork 46 secured to the casing.

Advantageously, the hinge between the cylinder 33 and the casing 12 is arranged in the vicinity of the end of the cylinder from which the rod 34 extends. In other words, the lateral tab 44 extends close to the end of the cylinder 33 from which the rod 34 emerges.

Advantageously, the hinge between the cylinder and the casing (elements 46, 44) is situated substantially in the middle of the actuator 32 when the rod is deployed to its maximum stroke. This configuration minimizes the angular movement of the actuator 32 during the stroke of the actuator ring, thereby enabling the actuator to be housed in a relatively small amount of space around the casing.

The invention claimed is:

1. A turbine engine comprising:
a casing housing at least one stator stage including variable-pitch vanes controlled by an actuator ring coaxially surrounding the casing, wherein the ring is constrained to move in turning only about an axis of the casing and being connected by crank-arms to the variable-pitch vanes,
wherein the actuator ring is coupled to at least one adjacent specific drive unit generally in a form of an actuator and comprising first and second portions forming a cylinder and a rod extending from the cylinder, wherein the first portion is hinged to the casing, and the second portion is directly hinged to a lateral extension of the ring, the lateral extension of the ring being rotationally stationary relative to the ring,
wherein the rod is directly hinged to the ring and the cylinder is hinged to the casing, and
wherein the hinge between the cylinder and the casing is arranged in a vicinity of an end of the cylinder from which the rod extends.

2. A turbine engine according to claim 1, wherein the rod of the actuator-forming drive unit extends along an axis lying in a plane parallel to a midplane of the actuator ring.

3. A turbine engine according to claim 1, wherein the hinge is situated substantially in a middle of the actuator when the rod is deployed to its maximum stroke.

4. A turbine engine according to claim 1, wherein the lateral extension includes a fork, and an end of the rod is directly hinged to the fork about an axis parallel to the axis of the casing.

5. A turbine engine according to claim 4, wherein the fork of the lateral extension includes first and second plates, and the end of the rod includes a flat portion inserted between the first and second plates of the fork.

6. A turbine engine according to claim 1, wherein the cylinder includes a lateral tab hinged to a fork secured to the casing.

7. A turbine engine according to claim 1, wherein the actuator is of linear motion electric motor type.

8. A turbine engine according to claim 1, wherein each actuator ring is coupled to two adjacent specific drive units that are substantially diametrically opposite.

9. A turbine engine according to claim 1, wherein a first end of the rod is inside the cylinder and a second end of the rod is directly hinged to the casing.

10. A turbine engine according to claim 1, wherein the lateral extension of the ring is fixedly attached to the ring.

11. A turbine engine comprising:
a casing housing several stator stages including variable-pitch vanes, each stator stage being controlled independently by an actuator ring coaxially surrounding the casing, wherein said ring is constrained to move in turning only about an axis of the casing and being connected by crank-arms to the variable-pitch vanes of said stator stage,
wherein each actuator ring is coupled to at least one adjacent specific drive unit generally in a form of an actuator and comprising first and second portions forming a cylinder and a rod extending from the cylinder, wherein the first portion is hinged to the casing, and the second portion is directly hinged to a lateral extension of the ring, the lateral extension of the ring being rotationally stationary relative to the ring.

* * * * *